(12) United States Patent
Boetzel et al.

(10) Patent No.: US 7,079,568 B1
(45) Date of Patent: Jul. 18, 2006

(54) FREQUENCY HOPPING METHOD FOR A MOBILE RADIO TELEPHONE SYSTEM

(75) Inventors: Ulrich Boetzel, Kaarst (DE); Dieter Brueckmann, Meerbusch (DE); Christian Kranz, Ratingen Lintorf (DE); Rüdiger Pott, Witten (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/979,919

(22) PCT Filed: May 26, 2000

(86) PCT No.: PCT/DE00/01716

§ 371 (c)(1),
(2), (4) Date: Mar. 15, 2002

(87) PCT Pub. No.: WO00/74256

PCT Pub. Date: Dec. 7, 2000

(30) Foreign Application Priority Data

May 27, 1999 (DE) ................................ 199 24 249

(51) Int. Cl.
*H04B 1/69* (2006.01)
(52) U.S. Cl. ...................................................... 375/132
(58) Field of Classification Search ................ 375/131, 375/132, 133, 260, 295; 370/335, 330, 334, 370/336, 342, 345; 455/561, 451, 452
See application file for complete search history.

(56) References Cited

U.S. PATENT DOCUMENTS

| 5,323,447 A | 6/1994 | Gillis et al. ................... 379/61 |
|---|---|---|
| 5,528,623 A | 6/1996 | Foster, Jr. ................... 375/202 |
| 5,802,110 A * | 9/1998 | Watanabe et al. ........... 375/259 |
| 5,809,059 A | 9/1998 | Souissi et al. .............. 375/202 |
| 5,848,095 A | 12/1998 | Deutsch ..................... 375/202 |
| 5,862,142 A * | 1/1999 | Takiyasu et al. ............ 370/480 |
| 5,912,918 A * | 6/1999 | Bauchot et al. ............. 375/133 |
| 5,995,533 A * | 11/1999 | Hassan et al. .............. 375/140 |
| 6,014,406 A * | 1/2000 | Shida et al. ................. 375/133 |
| 6,223,048 B1 * | 4/2001 | Noll Barreto et al. ...... 455/517 |
| 6,396,823 B1 * | 5/2002 | Park et al. ................... 370/335 |

FOREIGN PATENT DOCUMENTS

| DE | 197 42 347 A1 | 4/1999 |
|---|---|---|
| EP | 0 621 707 A2 | 10/1994 |
| WO | WO 99/09671 | 2/1999 |

OTHER PUBLICATIONS

English Translation of PCT International Preliminary Examination Report, dated Oct. 30, 2001, 7 pgs.
Database WPI, Section Ch, Week 199508, Class A96/ AN 1995-057300, XP002153780 (1994).

* cited by examiner

*Primary Examiner*—Emmanuel Bayard
(74) *Attorney, Agent, or Firm*—Peter F. Corless; Steven M. Jensen; Edwards Angell Palmer & Dodge LLP (57) ABSTRACT

A frequency hopping method for a mobile radio system by which the carrier frequency of the base station (11) and of one or more mobile stations (12) of the mobile radio system is temporally changed in defined intervals according to a pre-determined frequency hopping scheme. Preferably, certain operational conditions of the mobile radio system are monitored and the frequency hopping scheme is adaptively adjusted according thereto. As a result, during operation, a frequency hopping sequence can be adjusted to the present operational conditions, especially to the influence of possible interfering signal.

15 Claims, 4 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| base station (top) | $P_T$ $N_T$ | $M_T$ $C_T$ $N_T$ | $P_T$ $N_T$ | $M_T$ $C_T$ $N_T$ | $P_T$ $N_T$ | $M_T$ $C_T$ $N_T$ | $P_T$ $N_T$ | $M_T$ $C_T$ $N_T$ | $Q_T$ | $M_T$ $C_T$ $N_T$ | $P_T$ $N_T$ | $M_T$ $C_T$ $N_T$ | $P_T$ $N_T$ | $M_T$ $C_T$ $N_T$ | $N_T$ | $M_T$ $C_T$ $N_T$ |
| mobile station (bottom) | $M_T$ $N_T$ $C_T$ | $N_T$ $N_T$ $C_T$ | $M_T$ $N_T$ $C_T$ | $N_T$ $N_T$ $C_T$ | $M_T$ $N_T$ $C_T$ | $N_T$ $N_T$ $C_T$ | $M_T$ $N_T$ $C_T$ | $N_T$ $N_T$ $C_T$ | | $M_T$ $N_T$ $C_T$ | $N_T$ $N_T$ $C_T$ | $M_T$ $N_T$ $C_T$ | $N_T$ $N_T$ $C_T$ | $M_T$ $N_T$ $C_T$ | $N_T$ $N_T$ $C_T$ | $M_T$ $N_T$ $C_T$ | $N_T$ | priority →

FIG 8

FREQUENCY HOPPING METHOD FOR A MOBILE RADIO TELEPHONE SYSTEM

BACKGROUND OF THE INVENTION

The present invention relates to a frequency hopping method for a mobile radio system, especially for a WDCT mobile radio system.

Frequency hopping is used as is known in communication systems, especially in mobile radio systems to improve the transmission reliability. For this purpose the carrier frequency is changed in defined intervals, whereby in a mobile radio system the mobile stations are prompted by the base station to hop frequencies. Equally the sequence of the frequency hopping, that is to say the sequence of the carrier frequencies to be used after each other is notified to the mobile stations by the base station.

A known mobile radio standard, in which for example frequency hopping is used, is the so-called DECT (Digital European Cordless Telephone) mobile radio standard. This mobile radio standard was developed by ETSI (European Telecommunications Standard Institute), in order to have a leading European system also available for so-called CT (Cordless Telephone) applications, that is to say for cordless telephony. The DECT-mobile radio standard provides very good transmission quality but with limited range. The use of cordless DECT-systems is therefore preferred in domestic homes or in business premises.

In the case of the DECT-mobile radio standard ten different carrier frequencies with an interval of 1728 kHz are used for frequency hopping. The frequency spectrum in total ranges from 1880 to 1900 MHz. The carrier frequencies to be used for frequency hopping are notified to the mobile stations by the base station via a control channel. For this purpose a control message is transmitted by the base station to the mobile stations, which informs the mobile stations of the carrier frequencies available to the base station for frequency hopping. This message covers a bit field where for ten possible carrier frequencies a bit is optionally set in each case to '1' or '0' by the base station. If the bit corresponding to a defined carrier frequency is set to '1', this means for the mobile station that the corresponding carrier frequency can be used for frequency hopping.

With the previously described principle frequency hopping is limited to a maximum of ten different carrier frequencies. The sequence of the carrier frequencies to be used for frequency hopping is pre-determined. If during a transmission for example a disturbance occurs due to a collision with interference frequencies, a new transmission using the same frequency hopping sequence is attempted which however often fails if the same disturbance (for example microwave frequencies) still continue.

Equally in further later standards, like for example Bluetooth or the SWAP Standard, static frequency hopping methods are used, with the aid of which collisions with interfering signals also cannot be reliably prevented and as a result the performance capability of the system is inevitably impaired.

Furthermore the DECT standard was essentially developed for the European telephone market. Since however the need for a reliable cordless telephone system also exists in the American market the so-called WDCT (Worldwide Digital Cordless Telephone) mobile radio standard was developed by the applicant based on the DECT standard. The WDCT standard uses a frequency band of between 2400 and 2483.5 MHZ which is compatible with the American FCC provisions for unlicensed operation.

As well as the frequency band being used according to the FCC provisions further conditions however are imposed on the mobile radio system being operated which amongst other things also concern the frequency hopping method used in each case. Thus the FCC provisions require that the frequency hopping method must encompass at least 75 different carrier frequencies since each frequency must not be used or maintained for longer than 0.4 sec within a period of 30 secs. Each frequency must on average be used the same number of times. Further it is required that the carrier frequencies being used in each case must be selected from a pseudo randomly arranged carrier frequency list.

SUMMARY OF THE INVENTION

The present invention is generally based on the aim of proposing a frequency hopping method for a mobile radio system with which more secure operation and better transmission reliability can be achieved. Especially the frequency hopping method should make it possible to meet the aforementioned FCC provisions as well as frequency hopping based on the DECT standard with as little change to the DECT protocol as possible.

The aforementioned aim is achieved according to the present invention by a frequency hopping method.

According to the invention defined operational conditions of the mobile radio system, especially the presence of possible noisy carrier frequency channels, are monitored and the pre-determined frequency hopping sequence is adapted accordingly thereto. Preferably depending on the aforementioned monitoring the mobile stations are notified which of the carrier frequencies intended according to the pre-determined frequency hopping sequence should not be used.

The present invention therefore allows the use, optimally adapted to the particular operational conditions, of a large number of carrier frequencies, with the individual mobile stations being notified in each case by the base station which of the carrier frequencies are to be used. In particular with the help of the present invention compliance with the FCC provisions described above is possible.

The update information about which of the carrier frequencies should not be used is transmitted via a control channel of the mobile radio system. The mobile radio system preferred is in the form of a WDCT mobile radio system based on the DECT standard configured with 95 possible carrier frequencies in the frequency range of between approx 2400 and 2500 MHz, whereby the previously mentioned update information can be transmitted via the $N_T$ or $Q_T$ control channel. For this purpose corresponding changes of the DECT protocol are proposed in accordance with certain embodiments of the invention.

The change of the carrier frequency can be implemented both from frame to frame as well as from time slot to time slot, that is to say within a frame.

The invention is described below in more detail by way of preferred embodiments with reference to the attached drawing.

The present invention is explained below by way of the WDCT mobile radio method developed by the applicant whereby however the invention can essentially also be applied to other telecommunication standards.

The WDCT mobile radio standard is as already explained based on the known DECT mobile radio standard.

Figure 6:
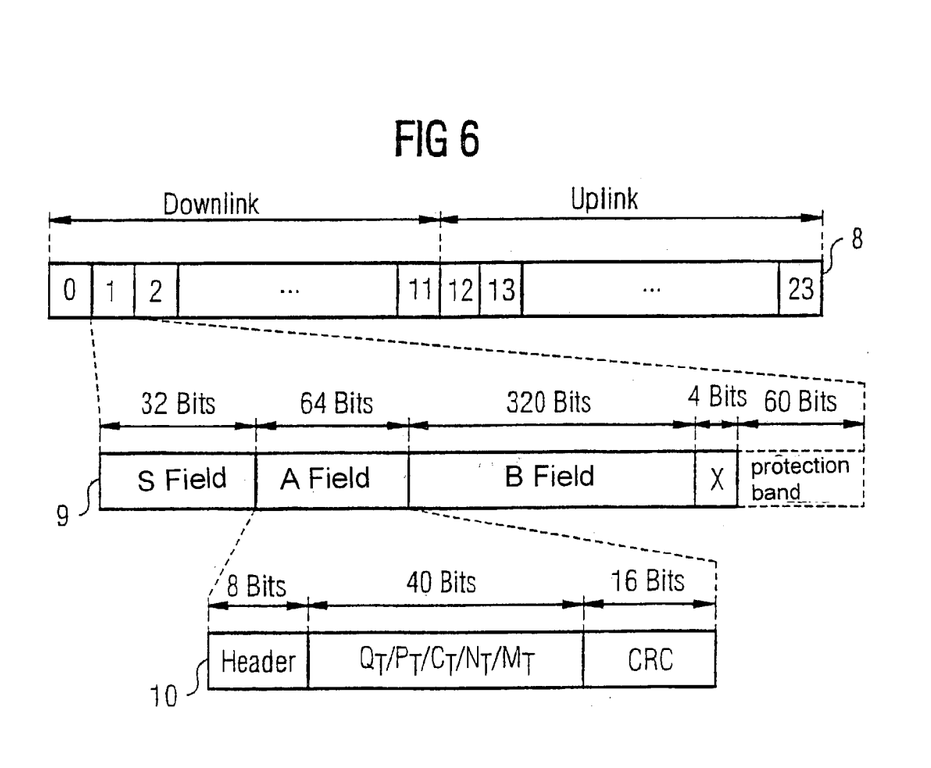
FIG. 6 shows the structure of a frame transmitted according to the DECT mobile radio standard.

In FIG. 6 the frame and time slot structure for a transmission signal is illustrated according to the DECT standard. As already explained with the DECT standard the available frequency spectrum (1880–1900 MHz) is divided into ten carriers each of 1728 KHz.

As shown in FIG. 6 each carrier frame 8 is divided into 24 time slots of 480 bits (time slot duration 416.6 μsec) whereby for the downlink, that is to say for a transmission from the base station to a mobile station, the first 12 and for the uplink, that is to say for a transmission from a mobile station to the base station, the second 12 time slots are provided. For a duplex connection pairs of time slots are formed, whereby for example the time slot 11 and the time slot 23 form a pair. In this way 12×10=120 duplex channels with a transmission rate of 1152 kbit/s are available.

The duration of the DECT frame shown in FIG. 6 is 10 ms, whereby every 10 ms in one time slot 9 388 bits which are available for the so-called MAC (Medium Access Control) Layer are transmitted once in a time slot. The main task of the MAC Layer is resource management, multiplexing of different control channels as well as protection against erroneous transmission.

As shown further in FIG. 6 the 388 bits intended for the MAC Layer encompass an S-field (32 bits) for synchronisation purposes, an A-field (64 bits) for control and signalling purposes, a B-field (40 bits) as useful data field and four spare bits. The corresponding time slot 9 is filled by a protection band (guardband) encompassing 60 bits.

FIG. 6 also shows the structure of the aforementioned A field 10. The 64 bits of the A field 10 are divided into a header (8 bits), certain control channels (40 bits) and a CRC (Cyclic Redundancy Check, 16 bits) field. The CRC field serves to detect transmission errors on the signalling or control channels. In each A field one or several logic control channels $Q_T$, $P_T$, $C_T$, $N_T$ and $M_T$ are transmitted in multiplexed form. Here the 40 bits of the A field available are divided in each case depending on current demand between the individual control channels whereby a priority scheme shown in FIG. 7 and embedded into a multi-frame structure encompassing 16 DECT frames 8 (0 . . . 15) is used. Thus for example the control channel CT is only transmitted in the A-field for example from the base station of the corresponding DECT mobile radio system in the frame No. 1 unless the MT control channel must be transmitted. In addition for example the control channel CT is only transmitted in the corresponding A field by a mobile station in this DECT mobile radio system unless either the control channel MT or the control channel NT must be transmitted. Thus in accordance with the priority scheme shown in FIG. 7 the assignment of the A fields of the individual control frames 8 is fixed temporally multiplexed both for the uplink as well as for the downlink.

Based on this known structure of the A field of a DECT frame, changes are proposed in accordance with the preferred embodiments of the present invention which enable update information to be transmitted in order to continually adapt the freqency hopping sequence, pre-determined by the base station at the beginning of the operation and subsequently stored preferably in the individual mobile stations in the form of a frequency hopping list, to the particular conditions so that it is ensured that only those frequencies are used for frequency hopping in which no collisions with interfering signals occur. In accordance with the invention therefore an adaptive frequency hopping strategy is proposed which enables collisions with interference frequencies to be circumvented or avoided.

Figure 8:
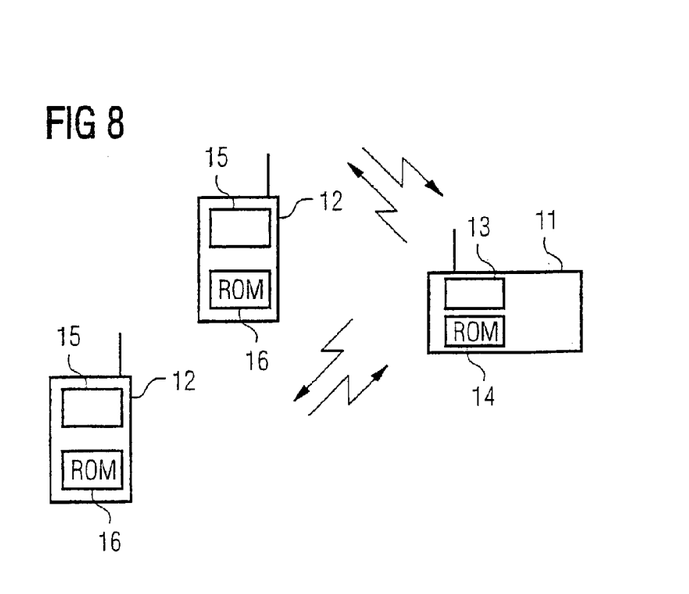
FIG. 8 shows a simplified block circuit diagram of a mobile radio system according to the invention.

In FIG. 8 the basic structure of a mobile radio system operated for example in accordance with the WDCT mobile radio standard with a base station 11 and several mobile stations 12 communicating with it are shown in a greatly simplified way. Both the base station 11 as well as the individual mobile stations 12 in each case have a WDCT controller 13 or 15, which is configured in such a way that in the frequency band 2400–2483.5 MHz, a cordless telephone operation is implemented using a frequency hopping method compatible with the US FCC provisions. Implementation of the frequency hopping strategy or frequency hopping method can in principle be left to the operator, whereby the sequence to be used during hopping of the carrier frequencies is specified by the base station 11 and transmitted to the mobile stations 12. This frequency hopping list is stored both in the base station 11 as well as in the mobile stations 12 in a ROM memory 14 or 16. During operation of the mobile radio system shown in FIG. 8, update information is preferably transmitted continuously to the mobile stations 12 by the base station 11 which notifies the mobile stations 12 which of the carrier frequencies stored in the frequency hopping list should not be used in future, in order to be able to take into consideration parasite influences occurring with certain carrier frequencies. For this purpose the frequency environment of the mobile radio system can be continuously monitored by the WDCT controller 13 of the base station 11 for possible interference frequencies or an updated frequency hopping list can be given by the operator of the mobile radio system to the base station 11.

To transmit this update information relating to the frequency hopping list or frequency hopping sequence stored in the mobile stations 12 but especially to meet the FCC provisions already mentioned, changes to the DECT-MAC Layer or the A field are required. These changes are made in accordance with the preferred embodiments of the present invention explained below especially in such a way that as little change to the DECT protocol as possible is necessary, so that the higher layers can be taken over by the DECT standard.

In the case of the WDCT mobile radio system shown in FIG. 8, 95 carrier frequencies are available in the frequency range of 2400 to 2483.5 MHz. The FCC provisions for using frequency hopping require at least 75 different carrier frequencies so that to avoid disturbances or collisions with interference frequencies a maximum of 20 available carrier frequencies cannot be used. The frequency hopping sequence actually used corresponds to a sub-set of the 95 frequencies available. For each base station 11 for example depending on the identification signal or ID of this base station a separate pseudo-randomly arranged list of these 95 carrier frequencies can be produced, keeping channel separation to a minimum, in order not to lose more than one carrier due to wide band interference. The frequency hopping list produced in this way is as already mentioned known both to the base station 11 as well as to all mobile stations 12 communicating with the latter.

If the WDCT Controller 13 of the base station 11 detects a noisy channel, that is to say a carrier frequency, in which no transmission is possible with sufficient quality, an update of the previously stored frequency hopping list or sequence is provided in order to eliminate these noisy channels from the frequency hopping cycle. In accordance with the invention therefore this involves an adaptive frequency hopping method.

Two frequency hopping concepts are described below whereby with the first concept the carrier frequency is changed from time slot to time slot, so that for different mobile stations 12 various frequency hopping sequences can be implemented which results in a very large amount of flexibility with greater control requirement. On the contrary according to the second concept it is proposed only to change the carrier frequency from frame to frame so that all mobile stations 12 synchronised to the same base station 11 must be operated with the same frequency hopping sequence. This second concept is more easy to implement but is less flexible.

The frequency hopping methods used must be designed in such a way that the different operational conditions of the mobile stations 12 and the base station 11 as well as the status changes possible in each case are taken into consideration. This will be explained in more detail below by way of the illustrations in FIG. 1 and FIG. 2.

Figure 1:
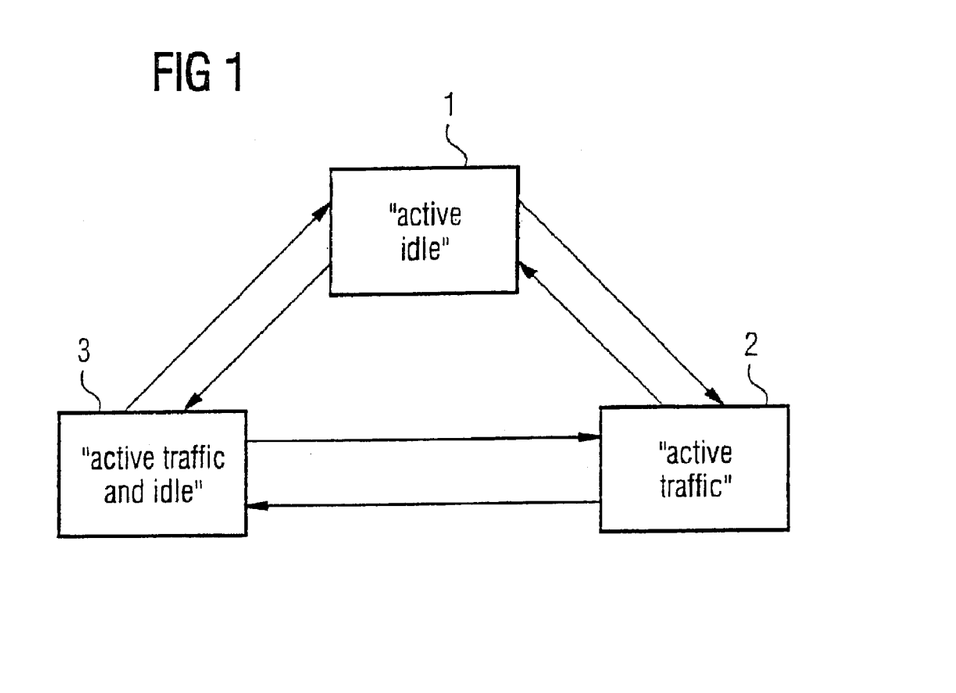
FIG. 1 shows a status diagram to explain the conditions occurring with a mobile radio according to the invention and status changes of the base station.

FIG. 1 shows the different active operational conditions of the base station 11 whereby the base station 11 is in an operational state 1 described as "active idle" unless there is a connection to a mobile station 12. In this state a so-called "dummy bearer" signal is sent by the base station 11 and at the same time periodically all physical channels available are scanned in order to detect a connection enquiry sent by a mobile station 12. As soon as a connection to a mobile station 12 is built up, the base station 11 changes to a state 2 described as "active traffic". It again changes to state 1 if all connections have broken up and a dummy bearer signal is again sent by the base station 11. The base station 11 changes from state 2 into state 3 described as "active traffic and idle" if a dummy bearer signal is also transmitted by it in addition to at least one "traffic bearer signal". Return from state 3 to state 2 occurs if no further dummy bearer signal is sent by the base station 11. Accordingly base station 11 changes from state 1 to state 3 as soon as at least one connection is built up, while a return from state 3 to state 1 takes place, if the last connection with a mobile station 12 has also broken up.

Figure 2:
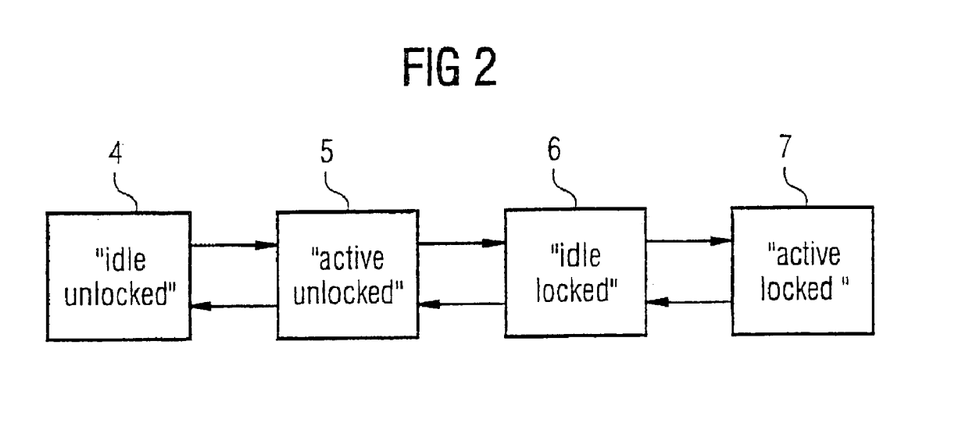
FIG. 2 shows a status diagram to explain the conditions occurring with a mobile radio system according to the invention and status changes of a mobile station.

FIG. 2 shows the different operational states of a mobile station 12 whereby the mobile station 12 is not active in a state 4 described as "idle unlocked". Directly after being connected the mobile station 12 changes to a state 5 described as "active unlocked". In this state the mobile station 12 tries to synchronise to the base station 11, all time slots with a fixed frequency being scanned. If for example no dummy bearer signal has been detected by the base station 11 within a period of one second, the frequency is changed. If the mobile station 12 has detected the dummy bearer transmitted by a base station 11 both a bit as well as a time slot synchonisation to the base station 11 is carried out automatically with the aid of the software and hardware used in the particular case. For this purpose the messages transmitted in each case in the A-field are evaluated. In contrast to the known DECT standard in which a fixed frequency hopping sequence is always used, synchronisation to the current valid frequency hopping sequence of the base station 11 must also be carried out in addition. After the synchronisation processes have been carried out the mobile station 12 changes to a state 6 described as "idle locked".

In this state the mobile station 12 can be operated in a sleep mode by entering a corresponding software command to reduce power consumption, whereby in this case the mobile station 12 or its controller 15 is activated only every n-th frame in order to detect a dummy bearer signal whereby n for example can be up to 64 for a sleep mode with minimum pulse width repetiton rate. The mobile station 12 can therefore remain sychronised with minimum power consumption to the base station 11. The sleep mode can be left by the controller 15 or the corresponding processor in two different ways. Either a multi-frame structure of monitoring multi-frame meters shown in FIG. 7 has counted down to zero or for example an external interrupt "waking up" of the processor is generated via the keyboard. After leaving the sleep mode the software of the corresponding mobile station 12 must be notified as to how long it was in sleep mode in order to be able to again start synchronisation with the frequency hopping sequence of the base station 11. For this reason the present values of the multi-frame meter already mentioned and the normal frame meter are known to the micro-controller 15.

As soon as a call is made by the mobile station 12 or the base station 11 a traffic bearer signal is sent. Normally the dummy bearer also continues. Then the mobile station 12 changes to a state 7 described as "active locked". The base station 11 in this case changes to the state 3 shown in FIG. 1 ("active traffic and idle"). The maximum number of simultaneous connections corresponds to the number of available time slots in the transmission direction. It must be ensured that the dummy bearer is released if a fourth connection is built up whereby the base station 11 changes to the state 2 shown in FIG. 1 ("active traffic").

As already mentioned both frequency hopping within a frame, that is to say between individual time slots, as well as only between two frames is possible in the context of the present invention.

With the first frequency hopping variant the carrier frequency must be changed between two time slots of the same frame.

Figure 7:
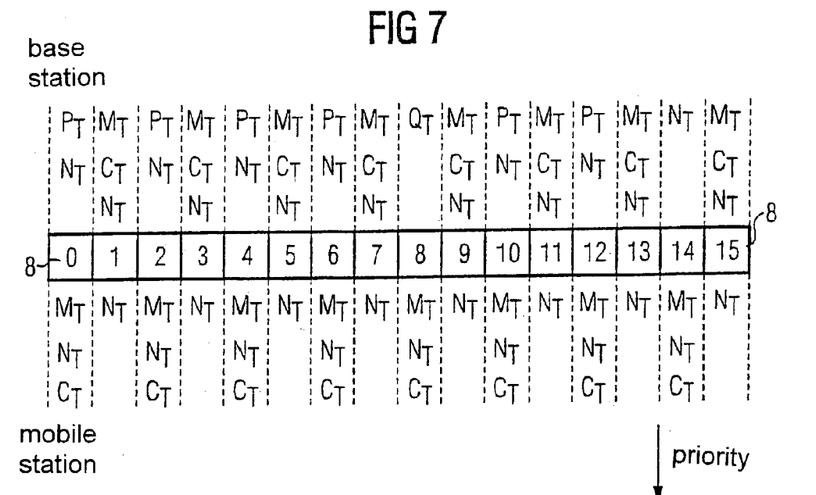
FIG. 7 shows the transmission and priority of control channels in a multi-frame structure.

All 95 carrier frequencies of the frequency hopping list stored in the base station are used to transmit the dummy bearer signal. This sequence is not changed to transmit the dummy bearer and is also only used for the dummy bearer. Since this sequence is also known to the mobile stations these can change their frequency after synchronisation to the base station. This frequency hopping sequence is used by all mobile stations which are in the synchronised state 6 ("idle locked") shown in FIG. 2. A mobile station in this state can, as already mentioned, be switched over to a power saving sleep mode, whereby in this case the mobile station is only activated in intervals of n frames to receive a dummy bearer signal. The A field of the dummy bearer signal shown in FIG. 6 should as with the the DECT standard contain a $P_T$ message in order to be able to detect connection enquiries from the base station. This can be implemented by the fact that the first frame of the multi-frame shown in FIG. 7 is always received.

If on the other hand a mobile station is in state 7 ("active locked") shown in FIG. 2 after a connection is built up, if interference occurs the frequency hopping sequence of the carrier signal should be changed or adapted. Since these changes of the frequency hopping sequence can be implemented individually for each traffic bearer, each mobile station may possess a different frequency hopping sequence after adaption. As will be explained in more detail below the update information for the frequency hopping sequence is transmitted for each traffic bearer with the aid of the A field of the corresponding time slots. After a connection has broken up the corresponding mobile station again changes to state 6 ("idle locked") whereby the valid frequency hopping sequence for this traffic bearer is also deactivated or broken up. The corresponding mobile station is then again sychronised to the dummy bearer signal of the base station.

As soon as four connections are active simultaneously the dummy bearer must be deactivated. Since a maximum of six mobile stations can be operated at the same time on one base station, this means that up to two mobile stations in state 6 ("idle locked") can lose their synchronisation with the base station. In order to prevent this the mobile stations in state 6 should be notified with the aid of the first frame of the multi-frame structure shown in FIG. 7 that the dummy bearer is deactivated. These mobile stations can then follow the last activated traffic bearer signal or its frequency hopping sequence whereby the frequency hopping sequence of this bearer signal must not be changed until all mobile stations in state 6 ("idle locked") have confirmed a corresponding request by the base station to change the frequency hopping sequence. It must be ensured that during the timespan in which a fourth traffic bearer signal is active, the mobile stations in state 6 have increased power consumption since they must receive the control field or A field in each frame, that is to say switch over to sleep mode should be avoided in this case. Should a connection again brake up so that less than four traffic bearers are active simultaneously the dummy bearer signal can be again activated and the mobile stations in state 6 can again be changed over to the frequency hopping sequence of this dummy bearer.

According to the second frequency hopping variant the carrier frequency must only be changed at the beginning of a new frame, that is to say all time slots of a frame are transmitted on the same carrier frequency.

Also with this variant of frequency hopping strategy described for a frequency change within a frame can be used in principle. As soon as a traffic bearer signal has been activated its frequency hopping sequence is also adapted depending on the frequency environment of the mobile radio system. Since as a result the dummy bearer is also influenced, all mobile stations must be notified by an update of the frequency hopping sequence in order to be able to carry out appropriate measures themselves. Thus in this case for example use of the sleep mode for the mobile stations in state 6 ("idle locked") can be dispensed with, so that these can follow the frequency hopping sequence of the dummy bearer. However this results in increased power consumption of these mobile stations. If it is not possible to dispense with the sleep mode, this means that the mobile stations concerned only search in intervals of n frames for the dummy bearer signal. In this case then the frequency hopping sequence of the traffic bearer must not be changed until all mobile stations in state 6 have confirmed a corresponding request by the base station as a result of which the timespan until the frequency hopping sequence has been adapted is extended and as a result sensitivity against parasite signals is increased. In the case of the second frequency hopping variant described previously in contrast to frequency hopping within a frame when a second connection is built up, the first traffic bearer signal should be used for synchronisation, that is to say the mobile stations in state 6 ("idle locked") no longer change their frequency in accord with the dummy bearer signal, but with the first traffic bearer signal.

In the case of both frequency hopping variants described previously the mobile stations are notified of the carrier frequencies in each case currently valid for frequency hopping via the A-field. The corresponding message should preferably be confirmed by the mobile stations concerned before the frequency hopping sequence is actually changed. For transmitting this update information concerning the frequency hopping sequence adaption of the DECT-MAC layer already described using FIG. 6 is necessary to implement the frequency hopping strategies described. This concerns especially the method as to how the update information can be transmitted by the base station to the mobile stations. This update information details, in view of possible collision with interference frequencies, which of the carrier frequencies intended in the original frequency hopping sequence should not currently be used.

With the DECT standard information about the available frequency channels is transmitted with the aid of the $Q_T$ message via the A field. According to the WDCT standard however in comparison with the DECT standard a number of time slots and carrier frequencies deviating from the latter are used so that adaption of the DECT protocol are necessary especially anywhere where this information is transmitted. While the four bits intended according to the DECT standard to identify the four time slot pairs are sufficient for the WDCT standard, this is not true in the case of the ten bits provided according to the DECT standard to identify the carrier frequencies. Therefore various possibilities to implement the present invention are indicated below.

According to a first embodiment of the present invention it is proposed that the $N_T$ message already provided according to the DECT protocol is used to transmit the previously mentioned update information.

Figure 3:
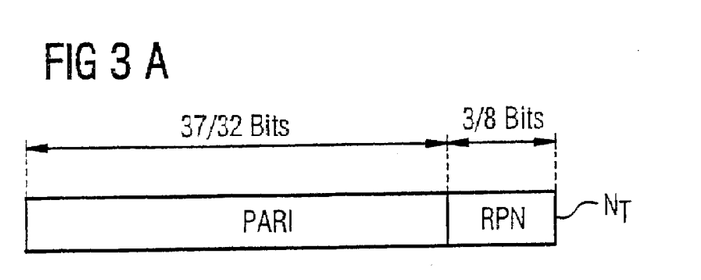
FIG. 3 shows a comparison of the $N_T$ message transmitted with a conventional DECT mobile radio system and a WDCT mobile radio system according to a first embodiment of the present invention.

FIG. 3A shows the division of the 40 bits of the A field shown in FIG. 6 in the case of an $N_T$ message according to the conventional DECT standard. According to the DECT Standard the $N_T$ message is divided into two sub-fields whereby the first sub-field covers so-called PARI (Primary Access Right Identifier) data and the second sub-field the lowest value bits of so-called RPN (Radio Fixed Part Number) data, PARI Classes A and B are used for the PARI data whereby in Class A the PARI data includes EMC (Equipment Manufacturer's Code) data and FPN (Fixed Part Number) data, while in Class B the PARI data includes EIC (Equipment Installer's Code) data and the FPN data. As shown in FIG. 3A the PARI data has 32–37 bits of the 40 bits available in total for the $N_T$ message.

According to the first embodiment of the invention it is intended that the bit number provided for the PARI data is reduced especially by eight bits This can be achieved in Class A by reducing the EMC and/or the FPN data and in Class B by reducing the EIC and/or FPN data. This is shown in FIG. 3B and the eight bits gained in this way then define the frequency hopping data HOP. This frequency hopping data HOP can for example specify which of the next eight carrier frequencies of the stored frequency hopping list must not be used.

Furthermore all available carrier frequencies can also be combined in blocks of for example twelve frequencies in each case, so that also in this event only eight bits are sufficient to deactivate one of these blocks and therefore all frequencies belonging to this block. As already mentioned according to the WDCT standard it is the intention to use all 95 carrier frequencies for frequency hopping. This means that one block only has eleven frequencies. The available carrier frequencies should always be grouped together so that if collisions with typical parasite signals occur the best possible transmission quality is assured.

However only a maximum of two of the eight frequency blocks grouped in this way should be eliminated from the pre-determined frequency hopping sequence. In this case the eight bits of the frequency hopping data HOP indicate those blocks which should not used for frequency hopping whereby for example a bit of the HOP field is allocated to each frequency block and the corresponding frequency block is deactivated if the bit has the value '0'.

According to a second embodiment of the present invention it is proposed that the $Q_T$ message already provided according to the DECT protocol is used and changed to transmit the update information previously mentioned.

FIG. 4A shows the format of the $Q_T$ message used with the DECT standard and described as "Static System Info" with the aid of which the available carrier frequency channels are notified to the mobile stations by the base station. The $Q_T$ message has the bits b8–b47 of the corresponding A field (see FIG. 6). The four bits b12–b15 define the number of that time slot pair (Slot Number, SN) at which the transmission should start. The ten bits b22–b31 (RF Carrier bits, RFC) notify the mobile stations which of the fixed pre-determined carrier frequencies are available at the base station. For this purpose a corresponding carrier frequency is allocated to each bit of the RFC field whereby the carrier frequency can be used if the corresponding bit has the value '1'. In addition the channel number (Channel Number, CN) of the bearer of this transmission is encoded in the $Q_T$ message. This CN data has the bits b34–b39. Finally the $Q_T$ message also contains so-called PSCN (Primary Receiver Scan Carrier Number) data which details that carrier frequency on which the receiver is operated in the next frame. The PSCN data has the bits b42–b47. Furthermore the $Q_T$ message has several spare bits (Spare bits, SP).

Since the WDCT standard uses 95 different carrier frequencies, the format of the known $Q_T$ message must be changed.

Thus several A fields with corresponding $Q_T$ messages could be used to define all 95 carrier frequencies. In the DECT standard a so-called "Extended RF Carrier Information" $Q_T$ message is already defined by the use of which only four of such $Q_T$ messages would be necessary to describe all 95 frequencies. As shown in FIG. 7 using the multi-frame structure illustrated there, the $Q_T$ message however is only transmitted within one frame, namely frame No. 8 of this multi-frame structure. This means that when using this "Extended RF Carrier Information" $Q_T$ message to transmit the total carrier frequency data four complete multi-frame structures will be necessary needing a total of 4×160 ms=640 ms and as a result is not advantageous for fast updating of the frequency hopping sequence.

For fast updating of the frequency hopping sequence therefore preferably more simple methods should be used. Thus the ten available bits b22–b31 of the RFC data can be used, similar to the change of the $N_T$ message already explained by way of FIG. 3 to establish which of the next carrier frequencies of the pre-determined frequency hopping list or—if the frequencies are grouped into several blocks—which of the individual frequency blocks should be used/activated or not used/deactivated. While according to the DECT standard the RFC field always involves the same carrier frequencies, when using the present invention, the RFC field involves either eight frequency blocks or only the next ten carrier frequencies of all 95 carrier frequencies.

As already mentioned the $Q_T$ message is only suitable to a limited extent for the WDCT standard to transmit the frequency hopping data since for this purpose on the one hand a relatively long timespan is necessary and on the other hand the frequency hopping data is identical for all mobile stations synchronised with the base station. The $Q_T$ message should therefore only be used to transmit the update or frequency hopping data or the frequency hopping variant in which the carrier frequency remains constant within one frame. When using the frequency hopping variant according to which the carrier frequency is changed within one frame between two time slots, the frequency hopping data contained in the $Q_T$ message should then be disregarded.

Figure 4:
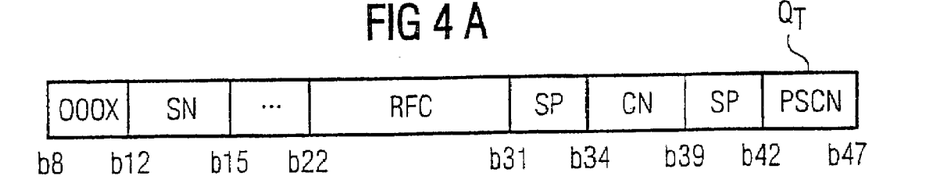
FIG. 4 shows a comparison of the $Q_T$ message transmitted with a conventional DECT mobile radio system and a WDCT mobile radio system according to a second embodiment of the present invention.

As shown in FIG. 4 an additional bit is needed for the WDCT standard to identify one of the 95 available carrier frequency channels, that is to say the CN field has the bits b34–b40. For this purpose one of the spare bits provided in the DECT standard is used. Equally for the WDCT standard as shown in FIG. 4, the PSCN field is expanded by one bit in order to take into consideration the larger carrier number in the case of the WDCT standard whereby for this purpose the other of the spare bits present in the case of the DECT standard between the CN and the PSCN field is used. The PSCN field can however be disregarded since this data is already contained in the frequency hopping list.

For the WDCT standard the $P_T$ message provided according to the DECT standard should also be adapted. This message will then be received by the mobile stations in state 6 ("idle locked") themselves if these are in sleep mode and serves to transmit connection enquiries from the base station. Furthermore some important data of the DECT-MAC layer is transmitted via this type of message.

Thus the $P_T$ message for example has twelve bits, which in each case are allocated to one of the twelve time slot pairs and notify the receiving mobile station, if due to possible parasite influences the corresponding time slot cannot be used. For this purpose the particular time slot pair is marked accordingly so that the mobile station always knows, via which time slots data can generally be expected. The same concept can also be applied to the WDCT standard, whereby however only four bits are necessary for this purpose.

Figure 5:
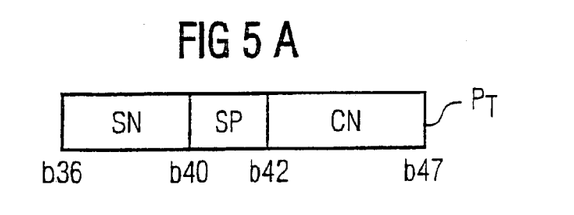
FIG. 5 shows a comparison of a section of the $P_T$ message transmitted with a conventional DECT mobile radio system and a WDCT mobile radio system in accordance with a further embodiment of the present invention.

The $P_T$ message is also used to transmit carrier data to the mobile stations, whereby this carrier data especially contains data about the other carriers, recommended carriers and dummy- or connection-less carrier positions. As shown in FIG. 5A this carrier data is transmitted encoded in the form of bits b36–b47 of the $P_T$ message and has an SN-field with bits b36–b39 to describe the time slot number, spare bits (SP) b40, b41 and a CN-field with bits b42–b47 to describe the channel number. In the case of the WDCT standard in principle this format can be taken over, whereby using one of the two spare bits it is possible to expand the CN-field for the channel number to eight bits b41–b47. Furthermore the SN-field can be reduced to two bits to describe the time slot number.

With the aid of the modifications to the DECT-MAC layer described above the frequency hopping data, that is to say data about the carrier frequencies used for frequency hopping, can be transmitted by the base station to the mobile stations. In this case it must be ensured that when using the $N_T$ message to transmit this frequency hopping data the $N_T$ message according to the priority scheme shown in FIG. 7 has minimum priority and in the worst case is only transmitted in frame No. 14. In this case synchronisation of a mobile station with the base station can fail, if no $N_T$ message is received and the next carrier frequency of the stored frequency hopping list is automatically deactivated. This however is only critical if in the cases previously described the traffic carriers must be used to synchronise with the base station.

The invention claimed is:

1. A frequency hopping method for a mobile radio system, the mobile radio system having a base station with a carrier frequency and at least one mobile station, each mobile station having a carrier frequency, the method comprising:
changing the carrier frequency of the base station and the carrier frequency of at least one mobile station temporally in defined intervals according to a pre-determined frequency hopping scheme;
monitoring certain operational conditions of the mobile radio system;
providing update information to adapt the frequency hopping scheme to a frequency environment of the mobile radio system;
transmitting the update information from the base station to each of the at least one mobile stations via a control channel of the mobile radio system and, further, indicating the carrier frequencies of the frequency hopping scheme to be avoided for the frequency hopping method by each of the at least one mobile stations to each of the at least one mobile stations; and
changing the carrier frequencies of the base station and each of the at least one mobile stations according to the pre-determined frequency hopping scheme based on the update information; and
whereby the update information for the next n carrier frequencies according to the pre-determined frequency hopping scheme of the at least one mobile station indicates whether or not the corresponding carrier frequency for the frequency hopping method should be used, or all carrier frequencies available for the frequency hopping method are combined in several frequency groups, whereby the update information indicates for each of these frequency groups whether or not the carrier frequencies belonging to the particular frequency group should be used for the frequency hopping method.

2. The frequency hopping method according to claim 1, wherein the method further comprises storing pre-determined frequency hopping scheme in the base station as well as in each of the at least one mobile stations.

3. The frequency hopping method according to claim 1, wherein the pre-determined frequency hopping scheme has carrier frequencies in a frequency range between approximately 2400 and 2500 MHz.

4. The frequency hopping method according to claim 1, wherein the method further comprises arranging the frequency hopping scheme with several carrier frequencies according to a pre-determined and random hopping sequencer; and
uniformly spacing said carrier frequencies at a defined frequency interval, whereby a minimum frequency hopping interval covers six carrier frequency channels in the pre-determined and random hopping sequence.

5. The frequency hopping method according to claim 4, wherein the pre-determined frequency and random hopping scheme has 95 different carrier frequencies.

6. The frequency hopping method according to claim 1, wherein the step of providing update information includes:
providing update information dependent on whether or not, when operational conditions of the mobile radio system are monitored, a noisy carrier frequency channel has been detected, and in the event that a noisy carrier frequency channel is detected, providing the update information so that it indicates avoidance of corresponding carrier frequency.

7. The frequency hopping method according to claim 1, wherein the step of transmitting the update information includes:
embedding communication data in a frame structure; and
transmitting the embedded communication data between the base station and each of the at least one mobile stations,
whereby each frame of the frame structure covers several time slots, and the carrier frequency is changed between individual time slots of a frame.

8. The frequency hopping method according to claim 1, wherein the step of transmitting the update information includes:
embedding communication data in a frame structure;
transmitting the embedded communication data between the base station and each of the at least one mobile stations, and
maintaining the carrier frequency constant within a frame but changing said carrier frequency from frame-to-frame.

9. The frequency hopping method according to claim 1, wherein the step of transmitting the update information includes:
transmitting the update information via a $N_T$ control channel, said $N_T$ control channel having a PART field.

10. The frequency hopping method according to claim 9, wherein the update information is transmitted in a field covering eight bits (HOP), whereby the PART field of the $N_T$ control channel is reduced by these eight bits.

11. The frequency hopping method according to claim 1, wherein the step of transmitting the update information includes:
transmitting the update information via a $Q_T$ control channel.

12. The frequency hopping method according to claim 11, wherein the step of indicating the carrier frequencies of the frequency hopping scheme to be avoided includes:
indicating for each of the available carrier frequencies with the aid of several Qr messages following on from each other, whether these should be used for the frequency hopping operation or not.

13. The frequency hopping method according to claim 1, wherein the method further comprises:
combining all carrier frequencies available for the frequency hopping method in several frequency groups, whereby the update information for each of these frequency groups indicates whether or not the carrier frequencies belonging to the particular frequency group should be used for the frequency hopping method, and
uniformly dividing available carrier frequencies among the frequency groups so that, if typical parasite influences occur, resulting in noisy carrier frequency channels, the best possible transmission quality is assured.

14. The frequency hopping method according to claim 1, wherein the update information is transmitted via a control channel.

15. The frequency hopping method according to claim 14, wherein the control channel includes a format that is based on a MAC layer of a DECT mobile radio standard.

* * * * *